(12) United States Patent
Sanada et al.

(10) Patent No.: US 7,695,099 B2
(45) Date of Patent: Apr. 13, 2010

(54) LIQUID FOR HEAD AND METHOD OF DETERMINING CONTENTS OF COMPONENTS THEREOF AND METHOD OF STABILIZING COMPONENT RATIO

(75) Inventors: Mikio Sanada, Kawasaki (JP); Nobuyuki Matsumoto, Tokyo (JP); Noribumi Koitabashi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 208 days.

(21) Appl. No.: 11/770,129

(22) Filed: Jun. 28, 2007

(65) Prior Publication Data

US 2007/0252868 A1 Nov. 1, 2007

Related U.S. Application Data

(63) Continuation of application No. PCT/JP2005/023849, filed on Dec. 27, 2005.

(30) Foreign Application Priority Data

Dec. 28, 2004 (JP) ............................. 2004-381749
Aug. 15, 2005 (JP) ............................. 2005-235404

(51) Int. Cl.
*B41J 2/165* (2006.01)
(52) U.S. Cl. ......................................................... 347/33
(58) Field of Classification Search .................. 347/28, 347/33
See application file for complete search history.

(56) References Cited

U.S. PATENT DOCUMENTS

| 5,451,251 A | 9/1995 | Mafune et al. ............. 106/22 H |
| 5,571,313 A | 11/1996 | Mafune et al. ............. 106/22 H |
| 5,708,068 A * | 1/1998 | Carder et al. ................ 524/375 |
| 5,911,815 A | 6/1999 | Yamamoto et al. ........ 106/31.27 |
| 5,969,731 A | 10/1999 | Michael et al. |
| 6,007,182 A | 12/1999 | Matsubara et al. ............ 347/43 |
| 6,027,210 A | 2/2000 | Kurabayashi et al. ........ 347/100 |
| 6,062,674 A | 5/2000 | Inui et al. ...................... 347/43 |
| 6,074,052 A | 6/2000 | Inui et al. .................... 347/101 |
| 6,095,639 A * | 8/2000 | Uetsuki et al. ................ 347/65 |

(Continued)

FOREIGN PATENT DOCUMENTS

DE 197 49 671 A1 5/1998

(Continued)

*Primary Examiner*—Stephen D Meier
*Assistant Examiner*—Alexander C Witkowski
(74) *Attorney, Agent, or Firm*—Fitzpatrick, Cella, Harper & Scinto

(57) ABSTRACT

To relate to a head liquid which is supplied to efficiently remove ink residues and the like which are attached to the surface of an inkjet head provided with ejection openings through which an ink containing a color material is ejected. In a case where a nonvolatile solvent such as glycerin is used as the head liquid, the nonvolatile solvent absorbs moisture, and thereby an extremely large change in mass is exhibited. As a result, the above supply amount is varied. To solve the problem, it was found that the previous mixing of water with the nonvolatile solvent can provide a smaller change in mass than that in a case where the nonvolatile solvent by itself is caused to absorb moisture. Accordingly, a mixture prepared by mixing the nonvolatile solvent and water in an appropriate predetermined ratio is used as a head liquid.

5 Claims, 11 Drawing Sheets

U.S. PATENT DOCUMENTS

| | | | |
|---|---|---|---|
| 6,164,772 A | 12/2000 | Koitabashi et al. | 347/100 |
| 6,174,354 B1 | 1/2001 | Takizawa et al. | 106/31.43 |
| 6,221,141 B1 | 4/2001 | Takada et al. | 106/31.6 |
| 6,224,186 B1 | 5/2001 | Johnson et al. | |
| 6,280,513 B1 | 8/2001 | Osumi et al. | 106/31.6 |
| 6,332,919 B2 | 12/2001 | Osumi et al. | 106/31.6 |
| 6,367,923 B1 | 4/2002 | Koitabashi | 347/101 |
| 6,375,317 B1 | 4/2002 | Osumi et al. | 347/100 |
| 6,379,000 B1 | 4/2002 | Koitabashi | 347/100 |
| 6,387,168 B1 | 5/2002 | Koitabashi et al. | 106/31.6 |
| 6,425,662 B1 | 7/2002 | Teraoka et al. | 347/100 |
| 6,435,658 B1 | 8/2002 | Kato et al. | 347/43 |
| 6,435,677 B1 | 8/2002 | Koitabashi et al. | 347/96 |
| 6,454,402 B1 | 9/2002 | Koitabashi et al. | 347/100 |
| 6,471,347 B1 | 10/2002 | Koitabashi et al. | 347/98 |
| 6,471,348 B1 | 10/2002 | Koitabashi | 347/100 |
| 6,471,757 B1 | 10/2002 | Koitabashi et al. | 106/31.28 |
| 6,494,569 B2 | 12/2002 | Koitabashi et al. | 347/98 |
| 6,511,534 B1 | 1/2003 | Mishina et al. | 106/31.33 |
| 6,517,191 B1 | 2/2003 | Koitabashi | 347/43 |
| 6,520,621 B1 | 2/2003 | Eckard et al. | |
| 6,527,385 B2 | 3/2003 | Koitabashi et al. | 347/101 |
| 6,533,392 B1 | 3/2003 | Koitabashi | 347/43 |
| 6,533,409 B2 | 3/2003 | Koitabashi | 347/101 |
| 6,540,329 B1 | 4/2003 | Kaneko et al. | 347/43 |
| 6,540,344 B2 | 4/2003 | Kashiwazaki et al. | 347/100 |
| 6,550,904 B2 | 4/2003 | Koitabashi et al. | 347/100 |
| 6,557,991 B2 | 5/2003 | Koitabashi et al. | 347/101 |
| 6,575,553 B1 * | 6/2003 | Williams et al. | 347/22 |
| 6,582,070 B2 | 6/2003 | Takada et al. | 347/100 |
| 6,585,815 B2 | 7/2003 | Koitabashi et al. | 106/31.27 |
| 6,612,691 B1 | 9/2003 | Koitabashi et al. | 347/105 |
| 6,706,105 B2 | 3/2004 | Takada et al. | 106/31.6 |
| 6,716,495 B1 | 4/2004 | Yoshino et al. | 428/32.16 |
| 6,786,587 B2 | 9/2004 | Koitabashi | 347/96 |
| 6,860,593 B2 | 3/2005 | Kashiwazaki et al. | 347/100 |
| 6,916,092 B2 | 7/2005 | Koitabashi et al. | 347/105 |
| 6,964,700 B2 | 11/2005 | Uji et al. | 106/31.28 |
| 7,005,461 B2 | 2/2006 | Sanada et al. | 523/160 |
| 7,160,376 B2 | 1/2007 | Watanabe et al. | 106/31.6 |
| 7,276,110 B2 | 10/2007 | Tsujimura et al. | 106/31.27 |
| 7,276,112 B2 | 10/2007 | Tokuda et al. | 106/31.6 |
| 2005/0024458 A1 | 2/2005 | Sanada et al. | 347/100 |
| 2006/0066699 A1 | 3/2006 | Tokuda et al. | 347/100 |
| 2006/0089424 A1 | 4/2006 | Sanada et al. | 523/160 |
| 2006/0098067 A1 | 5/2006 | Imai et al. | 347/100 |
| 2006/0098068 A1 | 5/2006 | Hakamada et al. | 347/100 |
| 2006/0103703 A1 | 5/2006 | Nito et al. | 347/100 |
| 2006/0103704 A1 | 5/2006 | Hakamada et al. | 347/100 |
| 2006/0135647 A1 | 6/2006 | Ichinose et al. | 523/160 |
| 2006/0170724 A1 | 8/2006 | Uji et al. | 347/16 |
| 2006/0192827 A1 | 8/2006 | Takada et al. | 347/100 |
| 2007/0188572 A1 | 8/2007 | Takayama et al. | 347/100 |
| 2007/0252881 A1 | 11/2007 | Sanada et al. | 347/100 |

FOREIGN PATENT DOCUMENTS

| | | |
|---|---|---|
| EP | 0 931 657 A1 | 7/1999 |
| EP | 1 018 431 A1 | 7/2000 |
| JP | 1-135652 | 5/1989 |
| JP | 10-138503 | 5/1998 |
| JP | 2000-203037 | 7/2000 |
| JP | 2003-320674 | 11/2003 |
| JP | 2004-106280 | 4/2004 |
| WO | WO 2004/043649 A1 | 5/2004 |

* cited by examiner

LIQUID FOR HEAD AND METHOD OF DETERMINING CONTENTS OF COMPONENTS THEREOF AND METHOD OF STABILIZING COMPONENT RATIO

BACKGROUND OF THE INVENTION

1. Field of the Invention

The present invention relates to a head liquid used to efficiently remove an ink residue and the like which adhere on a surface (hereinafter also referred to as ejection face) on which ink ejection openings of an inkjet head (hereinafter also referred to as a recording head) is formed. Moreover, the present invention relates to a method of determining the contents of components and a method of stabilizing a component ratio of the liquid as well as an inkjet recording apparatus using the liquid.

2. Description of the Related Art

A cleaning technique for a recording head which ejects an ink is a very important factor of an inkjet recording method because the method is the system in which input image data is converted to the output image using a liquid ink as a medium. Main problems in requiring the cleaning are briefly described as follows.

An ink ejection recording head directly ejects an ink through a fine nozzle (hereinafter, as such collectively referred to as an ejection opening, a liquid passage communicated therewith, and an element for generating energy utilized to eject ink unless otherwise stated) to a recording medium. Accordingly, the ejected ink hits against the recording medium and bounces back, and, in addition to the main ink involved in the recording when the ink is ejected, fine ink droplets (satellites) are ejected and drift in the atmosphere in some cases. Then, these droplets become ink mists, and, in some cases, adhere around the ink ejection opening of the recording head. Furthermore, dust drifting in the air may sometimes adhere thereto. Subsequently, the ejected main ink droplets are pulled by these attached matters, thereby the ink ejection direction is deflected, i.e., the main ink droplets are blocked from going straight in some cases.

Then, as a cleaning technique for solving this problem, an instrument called a wiping is employed to remove attached matters in the inkjet recording apparatus. The instrument wipes, at a predetermined timing, the ejection face of the recording head by means of a wiping member (wiper) made of an elastic material such as rubber.

Meanwhile, for the purpose of improving the recording density, water-resistance, light-resistance and the like of a recorded matter, an ink containing pigment components as a color material (pigment-based ink) has recently been used in many cases. The pigment-based ink is made by dispersing, in water, the color material which is originally solid by introducing a dispersant or a functional group on the surface of the pigment. Accordingly, the dried matter of the pigment ink formed by evaporating and drying the water content in the ink on the ejection face damages the ejection face seriously as compared to the dried sticky matter of a dye-based ink in which a color material itself is dissolved at a molecular level. A characteristic is also recognized that a high molecular compound used to disperse the pigment in a solvent tends to be adsorbed on the ejection face. This is a problem which occurs even in inks other than the pigment-based one in a case where a reaction liquid is added to an ink for the purpose of controlling the viscosity of the ink, improving light-resistance and for others, resulting in the presence of a high molecular compound in the ink.

To solve these problems, in Patent Documents 1 and 2, disclosed are techniques for removing an accumulated matter by applying a head liquid on the ejection face to reduce the wear of a wiper and dissolve the ink residue accumulated on the recording head in wiping the recording head. Moreover, the adhesion of a foreign matter to the recording head is prevented by forming a thin film of the head liquid on the recording head, and wiping easiness is improved by these. A construction in which the head liquid used in these wiping is stored in the body of a printer is employed.

In addition, in Patent Documents 1 and 2, disclosed are a step of cleaning by moving the wiper relative to the ejection face, and a step of supplying a nonvolatile solvent as a head liquid on the ejection face prior to the previous step. However, disclosed contents of the nonvolatile solvent are very few. Specifically, polyethylene glycol (PEG) having a molecular weight of 200 to 600 in Japanese Patent Laid-Open No. 10-138503, and polyethylene glycol having a molecular weight of 300 (PEG300) in Japanese Patent Laid-Open No. 2000-203037 are the only things that have been disclosed.

The present inventors found a problem that there were a large number of variations of the supply conditions of the solvent to the head, when a nonvolatile solvent was supplied prior to the cleaning step with the method disclosed in the above Patent Documents. When researching this problem further, the present inventors found that the causes which the nonvolatile solvent itself had were dominant. As long as the nonvolatile solvent is used by itself as the head liquid, it is usually natural that those skilled in the art select the nonvolatile solvent based on evaporation properties. Therefore, the present inventors researched processing solvents which do not tend to evaporate when the solvents are used as a head liquid. In this research process, the present inventors found that it was difficult to control the correlation between properties of the nonvolatile solvent itself and the moisture absorption property thereof attributable to the environment in which the nonvolatile solvent was placed. In addition, it was found that the nonvolatile solvent exhibited extremely large changes in weight due to moisture absorption, and thereby that the variation on the above supply amounts was not able to be reduced.

Then, the present inventors saw that the main technical problem is to stabilize the supply amount of the liquid by substantially reviewing the above liquid supplied to the ejection face to inhibit changes in weight (mass) due to the moisture absorption. When this problem was pursued, knowledge was obtained that the above problem can be solved by intentionally adding water to a nonvolatile liquid in advance. This is based on a completely reversed idea.

On the other hand, there has so far been a problem that the head liquid leaks out of the storage section due to changes in posture, vibration, and the like of the printer main body during the distribution. To be more specific, how the head liquid can be retained against leaking due to the posture, vibration, and the like during the distribution exists as an important problem to be solved. Moreover, the content of technique for inhibiting the changes in the physical properties (composition) of the head liquid due to the evaporation caused by the environmental changes during distribution and what kind of actions will be taken when drastic environmental change occurs are also important problems to be solved. The change in the physical properties (composition) of the head liquid due to the evaporation does not allow the head to sufficiently exert the cleaning effect at which the head liquid aims, thus resulting in damages to the ejection face. Furthermore, when the change in physical properties of the head liquid occurs by not only environmental change during distribution but also the change in the environment in which the printer is used, a problem occurs that the cleaning of the recording head at which an object of the head liquid aims cannot sufficiently be performed.

SUMMARY OF THE INVENTION

An object of the present invention is to provide a technology of solving at least one problem described above. Specifically, the present invention is to inhibit the change in physical properties (composition) of a head liquid caused by moisture absorption or evaporation due to the change in the environments during distribution and during use of the printer. Moreover, it is to remove the ink residues which adhere on an ejection face of a recording head stably and efficiently at any time. Furthermore, it is to prevent the liquid leaking from occurring.

Therefore, in the present invention related to a first aspect, a head liquid applied on a surface of an inkjet head provided with ejection openings to eject an ink containing a pigment as a color material therethrough by an application member moving relative to the surface, is characterized in that the head liquid to be applied on the surface of the head is supplied on the application member for applying, and is composed of glycerin and water within a range of a mass ratio from 75:25 to 95:5, respectively.

Here, the head liquid may be contained in a container.

Further, the head liquid may be supplied to the application member by moving the application member relative to the container.

In the present invention related to a second aspect, a method of determining contents of components of a head liquid which can be supplied on a surface of an inkjet head provided with ejection openings to eject an ink containing a color material therethrough, and which contains a previously mixed nonvolatile solvent and water as components, is characterized in that an amount of water mixed with the nonvolatile solvent is determined as an amount which provides a smaller change in mass than that in a case where the nonvolatile solvent by itself is caused to absorb moisture.

In the present invention related to a third aspect, a method of stabilizing a component ratio of a head liquid which can be supplied to a surface of an inkjet head provided with ejection openings to eject an ink containing a color material therethrough, and which contains a previously mixed nonvolatile solvent and water as components, is characterized by comprising a step of replenishing water in the head liquid to maintain a ratio of water mixed with the nonvolatile solvent within a range of a ratio which provides a smaller change in mass than that in a case where the nonvolatile solvent by itself is caused to absorb moisture.

The present invention related to a fourth aspect of exists on an inkjet recording apparatus characterized by comprising: means for applying a head liquid containing a previously mixed nonvolatile solvent and water as components to clean a surface of a inkjet head provided with ejection openings to eject an ink containing a pigment as a color material therethrough; a head liquid container for supplying the head liquid to the application means; means for replenishing water in the head liquid contained in the head liquid container, wherein the head liquid contains glycerin as the nonvolatile solvent, and that the replenishing means replenishes water so that the glycerin and water are within a range of a mass ratio from 75:25 to 95:5, respectively.

According to the invention related to the first aspect, the problem of moisture absorption is solved, and the property of the head liquid can be stabilized. According to the invention related to the second aspect, in addition to the invention related to the first aspect, it is possible to respond to the change in the posture of the main body of the recording apparatus, the vibration, and the like during the distribution. According to the invention related to the third aspect, guidelines can be provided for stabilizing the property of the head liquid. According to the invention related to the fourth aspect, the property of the head liquid can be maintained even if the environment is drastically changed. According to the invention related to the fifth aspect, the property of the head liquid is maintained, and thereby it is possible to perform the cleaning of the ejection face utilizing the property thereof.

Further features of the present invention will become apparent from the following description of exemplary embodiments (with reference to the attached drawings).

DESCRIPTION OF THE EMBODIMENTS

Figure 1:
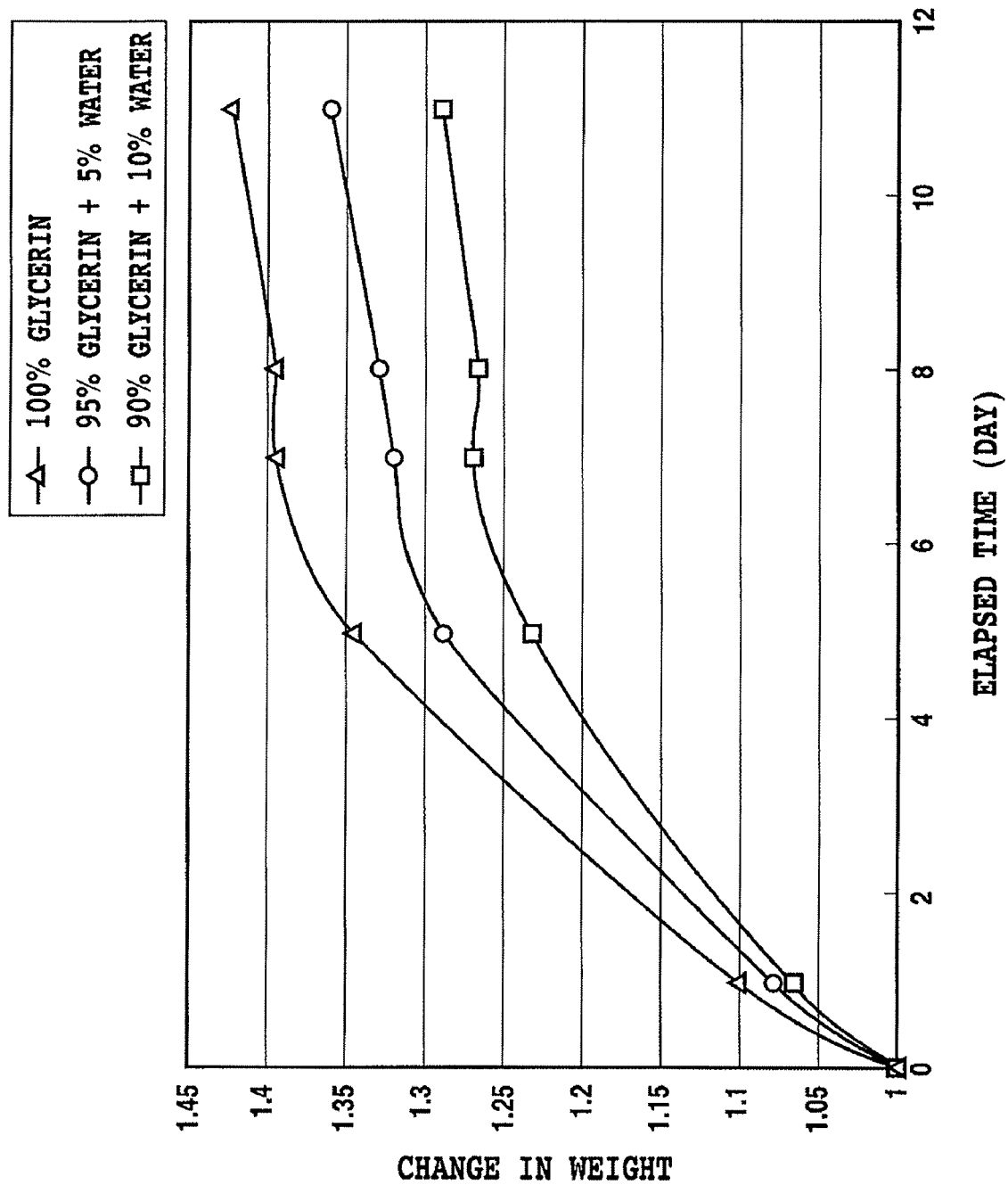
FIG. 1 is a graph showing the result of an experiment in which, when 100% glycerin, which is a nonvolatile liquid, and aqueous solutions of glycerin, in each of which solutions a predetermined mass ratio of water is previously mixed, are placed in a relatively high temperature and high humidity environment, the changes in weight due to moisture absorption are measured as time elapses.

The present invention will be described in detail below by referring to the drawings.

(Basic Concept of the Present Invention)

FIG. 1 is a graph showing the result of an experiment in which, with respect to 100% glycerin, which is a nonvolatile liquid, and aqueous solutions of glycerin each prepared by previously mixing with a predetermined mass ratio of water based on the above knowledge, the changes in weight due to moisture absorption are measured as time (day) elapses. Here, the experiment was carried out by putting the equal amounts of the above samples in petri dishes, respectively, and placing in a relatively high temperature and high humidity environment at a temperature of about 30° C. and a relative humidity of about 80%.

It was found from the result of this experiment that the changes in weight of those prepared by previously mixing with water were effectively inhibited as compared to that of 100% glycerin. Though this mechanism has not yet been clarified, it is considered that water molecules which are in the state of water vapor are prevented from invading from outside by the movement of the water molecule which is in the state of a liquid. Alternatively, it is considered that a glycerin molecule or the group thereof is surrounded by the group of water molecules which is hydrogen-bonded to block the water molecules in the state of the water vapor from invading. This is a problem to be studied in the future. However, in any case, it was found from the above results of the experiment that, when 5% or more of water is mixed, there were outstanding effects.

Figure 2:
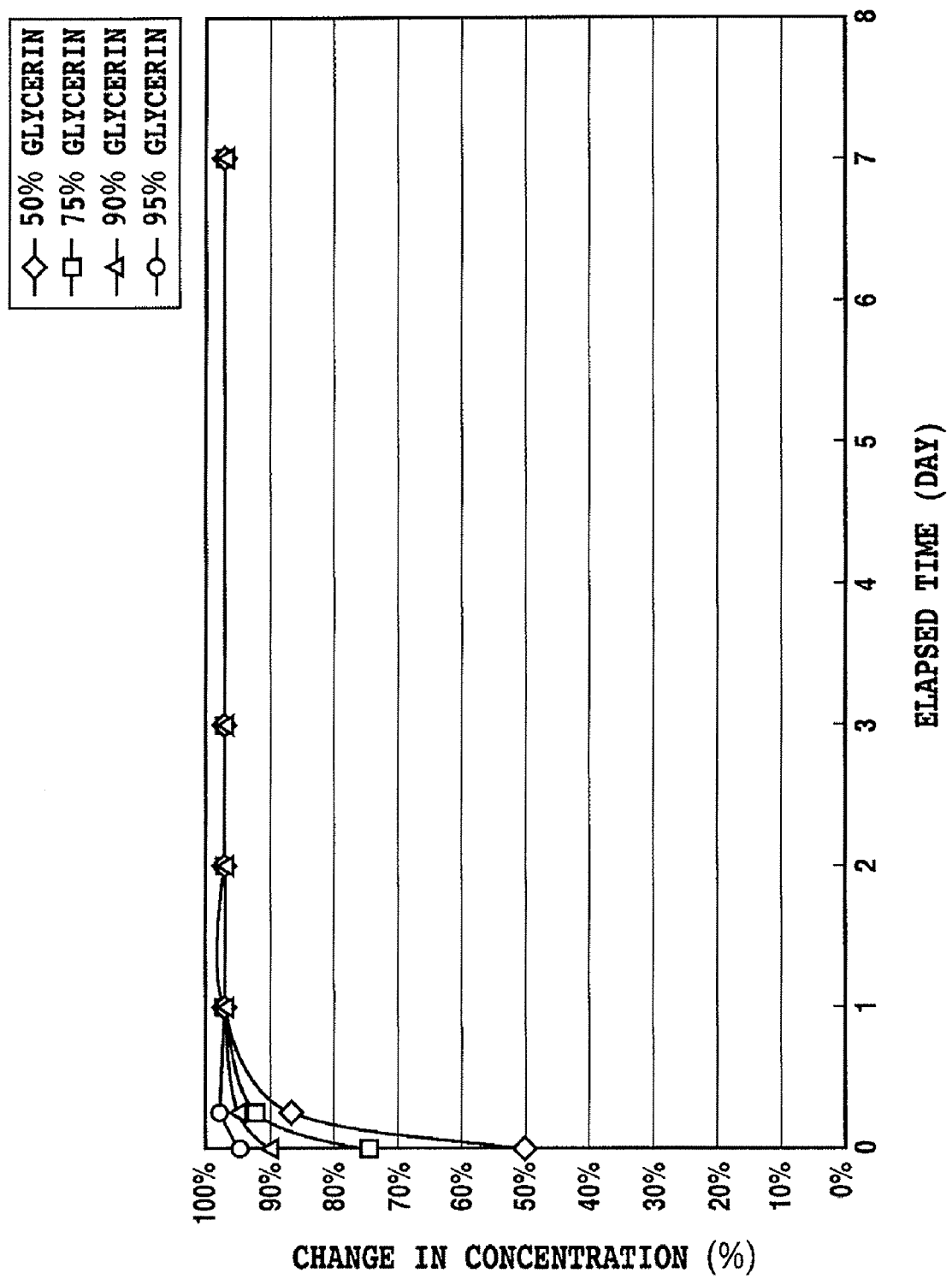
FIG. 2 is a graph showing the result of an experiment in which, when aqueous solutions of glycerin, in each of which solutions a predetermined mass ratio of water is previously mixed with glycerin, are placed in a relatively high temperature and low humidity environment, the changes in glycerin concentration due to moisture evaporation are measured as time elapses.

FIG. 2 is a graph showing the result of an experiment in which, with respect to aqueous solutions of glycerin each prepared by previously mixing in a predetermined mass ratio of water with glycerin, the changes in glycerin concentration due to the moisture evaporation are measured as time (day) elapses. Here, the experiment was carried out by putting the same amount of each glycerin mixture solution in each petri dish, and placing in a relatively high temperature and low humidity environment at a temperature of about 30° C. and a relative humidity of about 15%. It was found from the result of this experiment that the concentration of glycerin was increased to 98% in about two days irrespective of the original concentration of glycerin in a relatively high temperature and low humidity environment.

Figure 3:
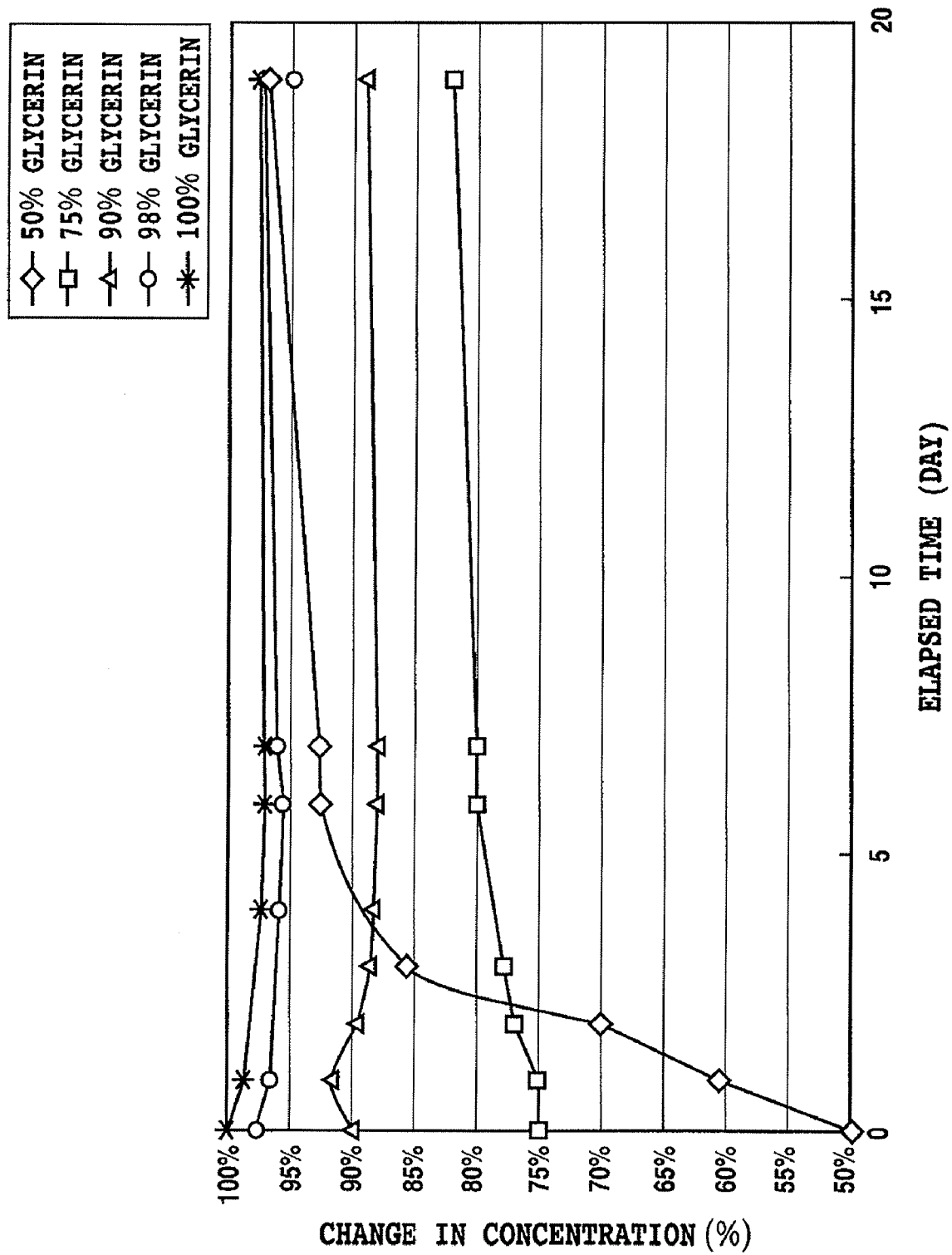
FIG. 3 is a graph showing the result of an experiment in which, when 100% glycerin and aqueous solutions of glycerin, in each of which solutions a predetermined mass ratio of water is previously mixed, are placed in a relatively low temperature and low humidity environment, the changes in glycerin concentration are measured as time elapses.

FIG. 3 is a graph showing the result of an experiment in which, with respect to 100% glycerin and aqueous solutions of glycerin each prepared by previously mixing with a predetermined mass ratio of water, the changes in concentration of glycerin are measured as time (day) elapses. Here, the experiment was carried out by putting the same amounts of the above samples in petri dishes, respectively, and placing in a relatively low temperature and low humidity environment at a temperature of about 5° C. and a relative humidity of about 15%. It was found from the result of this experiment that the concentration of glycerin was balanced near 95% irrespective of the original concentration of glycerin in a relatively low temperature and low humidity environment, and that, even with respect to those with an extremely high concentration of glycerin (98% or 100%), the concentration was reduced to about 95% by the moisture absorption. Moreover, it was found from the result of this experiment that, if the content ratio of the water is 25% or less, changes in concentration due to the moisture evaporation can be inhibited.

The present invention places a standard on determination of the contents of a nonvolatile liquid such as glycerin and water which are contained in the head liquid to be supplied to the ejection face having ejection openings through which an ink containing a color material is ejected, on the basis of the changes in weight due to the absorption of moisture, or of the above changes in the concentration of glycerin due to the moisture evaporation. In other words, the present invention has a basic technical concept in which the amount of water previously mixed with the nonvolatile liquid is determined in a way to provide changes in mass smaller than that in a case where the nonvolatile liquid by itself is caused to absorb moisture, and concurrently in a way that changes in concentration due to the moisture evaporation are small. Moreover, the present invention specifies that the head liquid to be supplied to the ejection face contains glycerin and water within a range of a mass ratio from 75:25 to 95:5, respectively.

From the above, it is possible to stably supply a head liquid at any time by inhibiting the change in the head liquid not only in an environmental change during the use of a printer but also in environmental change during the distribution of the main body thereof, and thus to stably clean a recording head. Moreover, the following effects can be obtained by preparing the head liquid in the above composition. Specifically, (1) Inhibition of Change in Head Liquid By previously intentionally mixing water, which is a factor of, for example, the change in the weight of the head liquid, within a certain range of a mixing ratio, the change in the head liquid can be inhibited in association with the absorption of moisture or the evaporation in various environments.

(2) Stable Supply

Even if changes in temperature and the like occur in an environment in which a printer is used, the head liquid can be stably supplied.

(3) Cleaning Performance

A high performance of cleaning an ejection face based on the above (1) and (2).

(4) Stability During Distribution and the Like

The above (2) and (3) can be achieved in a usual use environment which is not considered to thereafter change to an extreme extent by accommodating the head liquid in a tank to cope with a relatively harsh environment, for example, during distribution that are not assumed during the use. Moreover, the design conditions for the prevention of liquid leakage and the inhibition of the change in physical properties (composition) which are required of a tank to accommodate the posture and vibrations during the distribution and furthermore extreme environmental changes are alleviated because the weight or volume of the head liquid are less changed.

(Embodiment of Apparatus)

Figure 4:
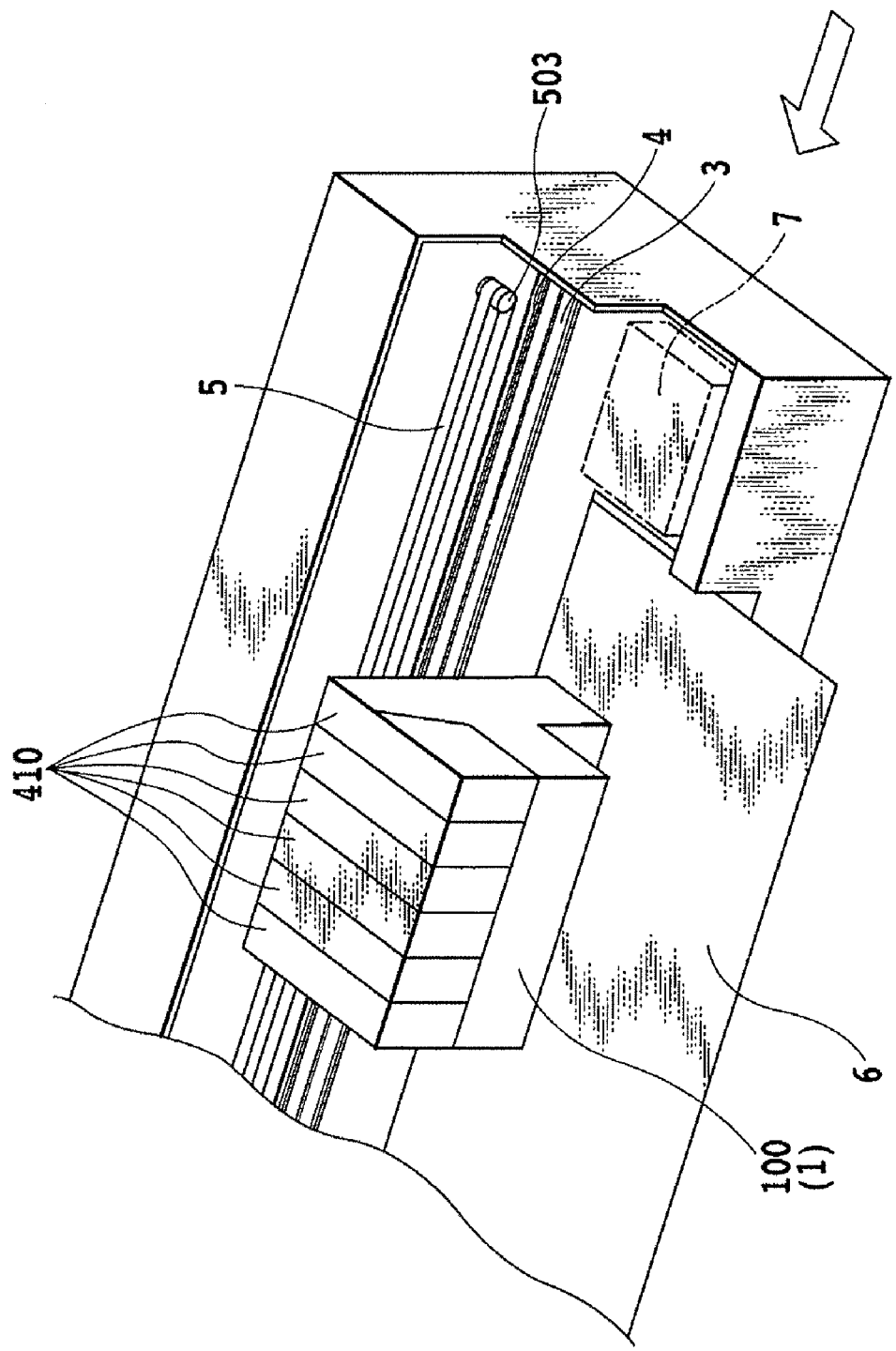
FIG. 4 is a diagrammatical perspective view of the main portion of an inkjet printer related to one embodiment of the present invention.

FIG. 4 is a diagrammatical perspective view of the main section of an inkjet printer related to an embodiment of the present invention.

In the illustrated inkjet recording apparatus, a carriage 100 is fixed to an endless belt 5, and is movable along a guide shaft 3. The endless belt 5 is wound on a pair of pulleys 503. The driving axis of a carriage driving motor (not illustrated) is connected to one of the pair of pulleys 503. Accordingly, the carriage 100 is caused to mainly scan along the guide shaft 3 reciprocally in the right and left directions in the drawing as the motor is rotatably driven. A cartridge-type recording head 1 which attachably and removably holds an ink tank 410 is mounted on the carriage 100.

Figure 5:
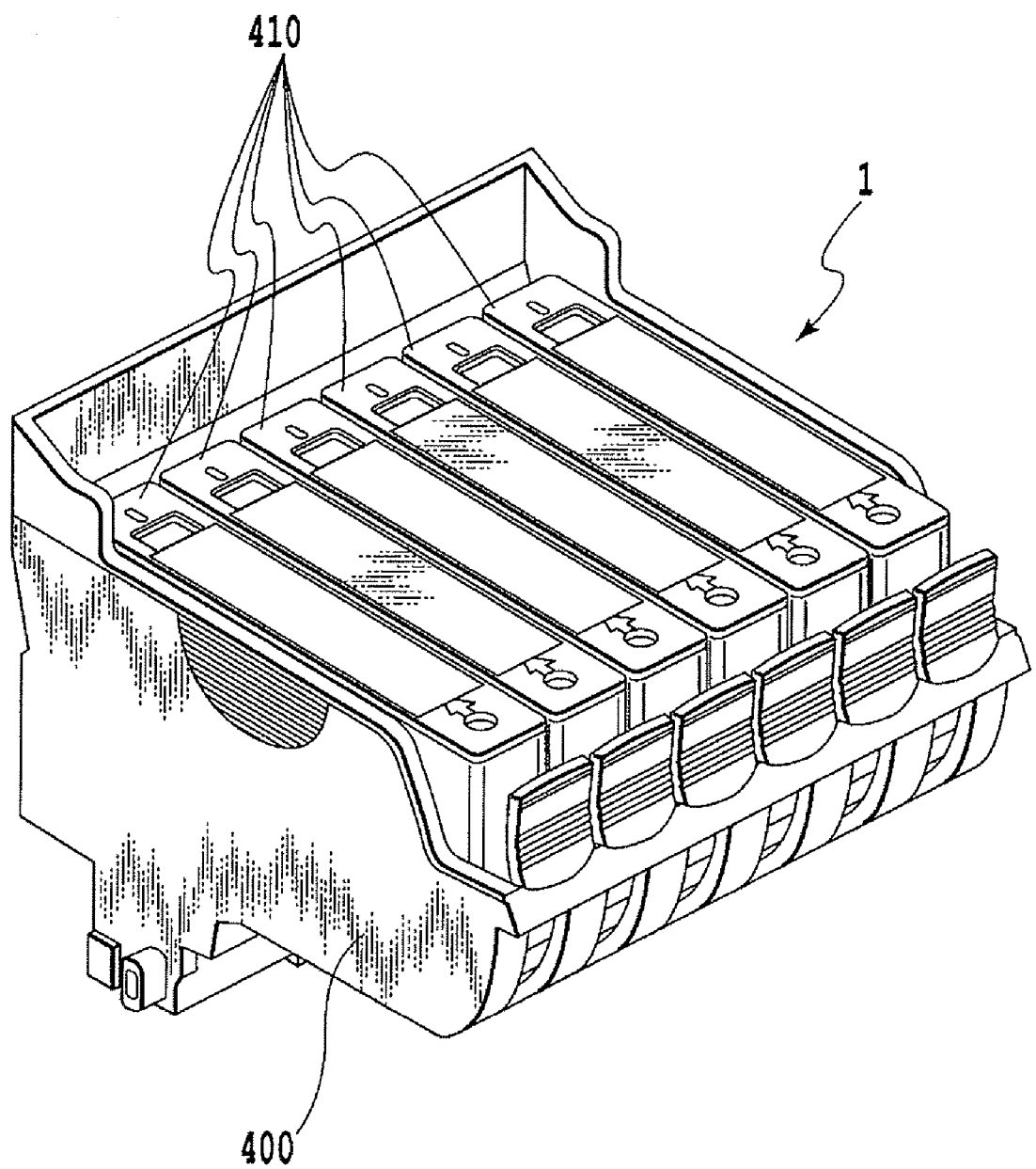
FIG. 5 is a perspective view showing one configuration example of a recording head which can be mounted to a carriage of the inkjet printer of the FIG. 4.
Figure 6:
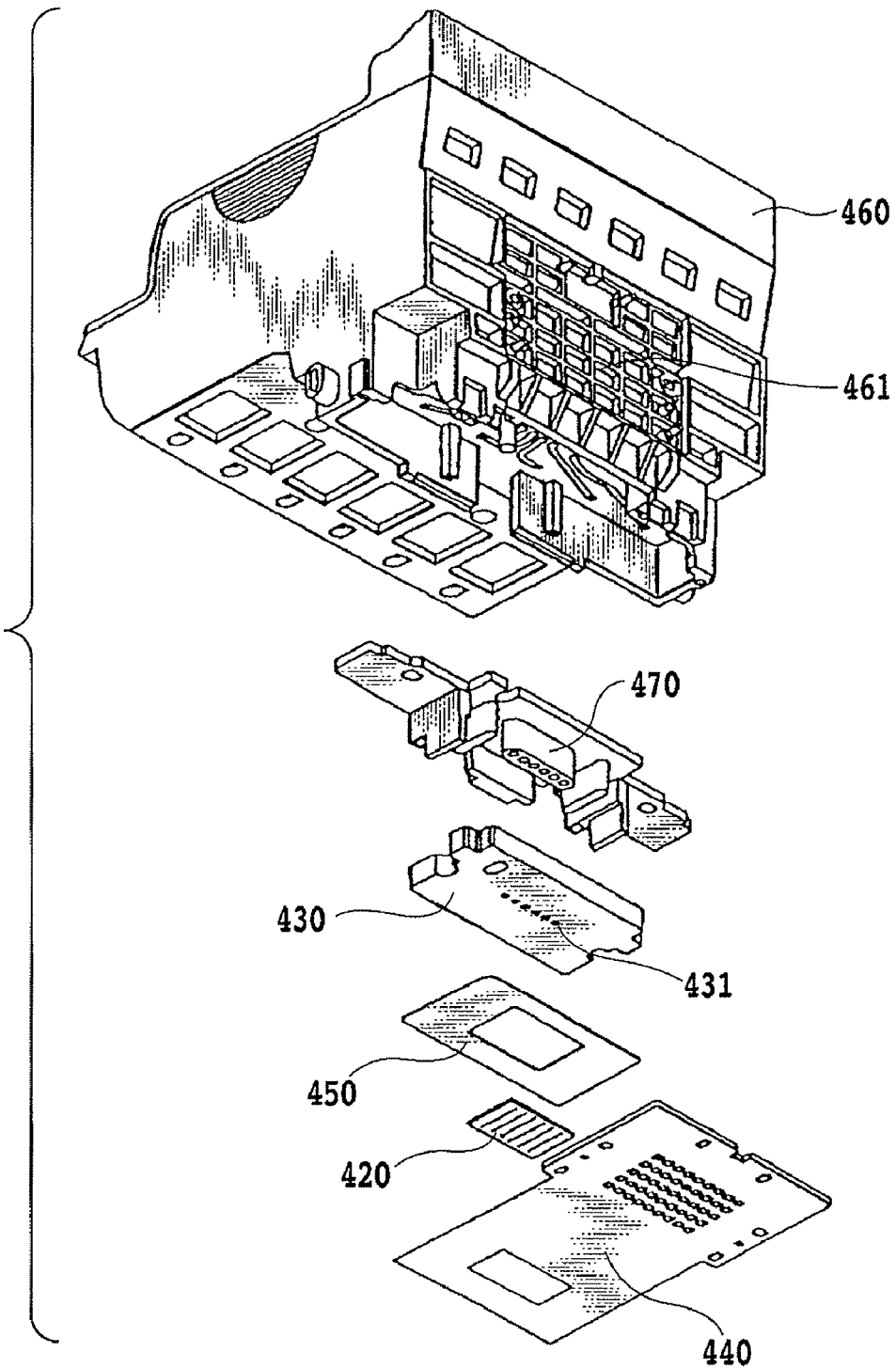
FIG. 6 is an exploded perspective view showing one configuration example of the recording head unit which is a component of the recording head of FIG. 5.

FIG. 5 is a perspective view showing one configuration example of the recording head 1 which can be mounted on the carriage 100 of FIG. 4. FIG. 6 is an exploded perspective view showing one configuration example of a head unit which is the component of the recording head 1.

The recording head 1 related to the present example includes a head unit 400 having arrays of ejection openings through which an ink is ejected, and ink tanks 410 each of which stores an ink and supplies the ink to the head unit 400. The recording head 1 is mounted on the carriage 100, so that ink ejection opening arrays provided to the head unit 400 faces to a paper sheet 6 which is a recording medium, and that the above array direction accords with a different direction (for example, sub-scanning direction which is the transporting direction of the recording medium 6) from a main scanning direction. A set of the array of ink ejection openings and the ink tanks 410 can be provided with the number corresponding to the number of the ink colors to be used. In the illustrated example, six sets are provided corresponding to six colors (for example, black (Bk), cyan (C), magenta (M), yellow (Y), pale cyan (PC) and pale magenta (PM)). In the recording head 1 shown here, the independent ink tanks 410 for each color are prepared, and each is attachable to and removable from the head unit 400.

As shown in FIG. 6, the head unit 400 is configured of a recording element substrate 420, a first plate 430, an electric wiring board 440, a second plate 450, a tank holder 460 and a flowpath formation member 470. The recording element substrate 420 having ejection opening arrays for respective color inks is adhesively fixed on the first plate 430 made of aluminum oxide ($Al_2O_3$) as a material. In the first plate 430, ink supply ports 431 are formed for supplying ink to the recording element substrate 420. The second plate 450 having an opening is furthermore adhesively fixed to the first plate 430. The second plate 450 holds the electric wiring board 440 so that the electric wiring board 440 which applies electric signals for ejecting an ink is electrically connected with the recording element substrate 420. On the other hand, the flow path formation member 470 is ultrasonically welded to the tank holder 460 attachably and removably holding the ink tank 410, and thereby an ink flow path (not illustrated) is formed across the ink tank 410 through the first plate 430.

Figure 7:
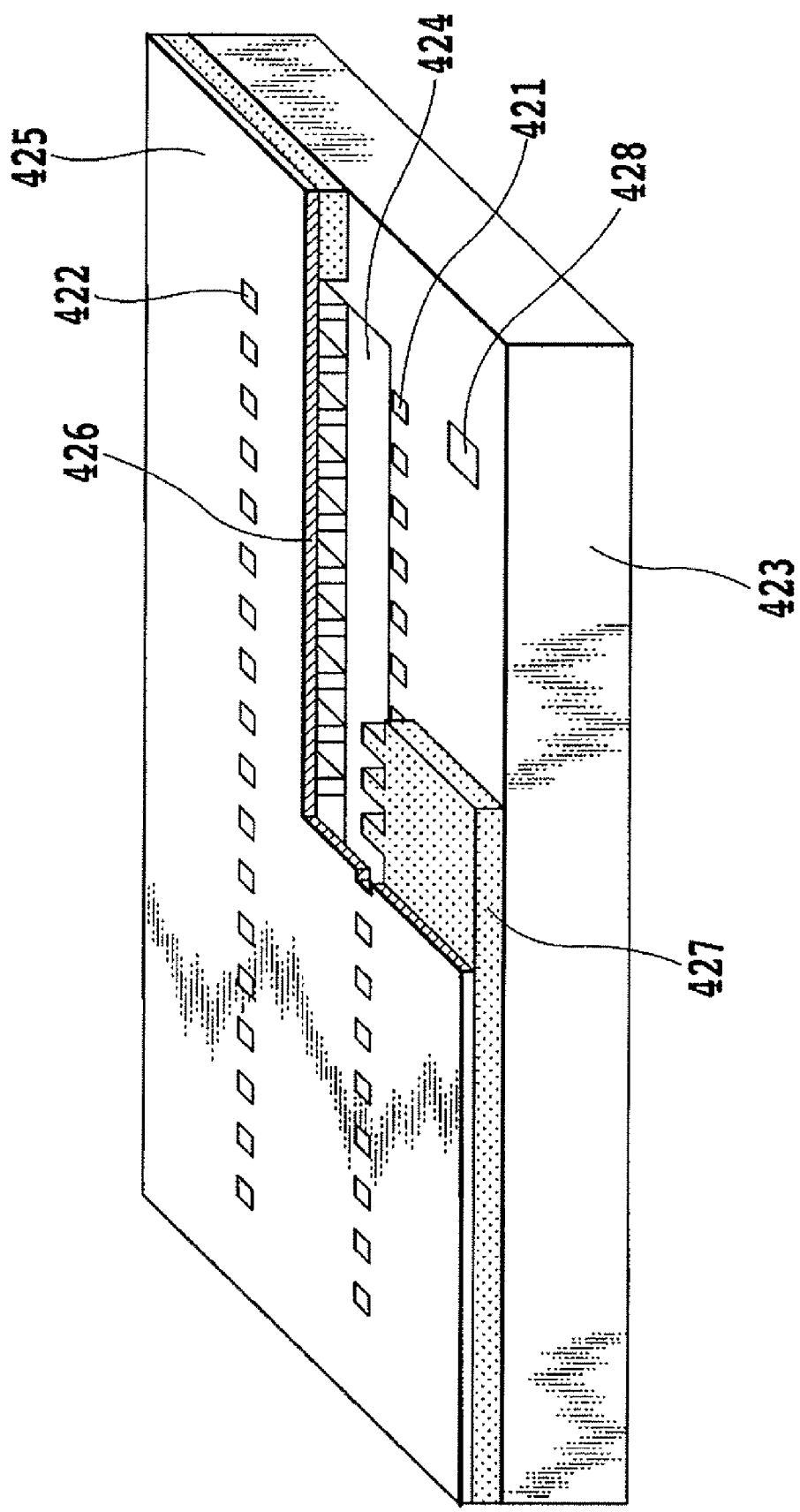
FIG. 7 is a partially ruptured perspective view showing a construction around ejection opening array for a single color on a recording element substrate used in the recording head of FIG. 6.

FIG. 7 is a partially ruptured perspective view showing the structure around the ejection opening array for a single color in the recording element substrate 420 shown in FIG. 6. In FIG. 7, a numeral 421 indicates a heat generation element (heater) which generates thermal energy which causes film boiling in an ink in accordance with the application of an electric current as energy utilized to eject an ink. A temperature sensor 428 for sensing the temperature of the head unit 400, and a sub-heater (not illustrated) for keeping the head or the ink warm in accordance with the detected temperature are provided on a base body 423 on which the heater 421 is mounted. A numeral 422 indicates an ink ejection opening, and a numeral 426 indicates an ink flow path wall. A numeral 425 indicates an ejection opening plate in which the ink ejection openings 422 are formed with a state facing to each heater. This plate is disposed on the base body 423 with a resin coated layer 427 interposed therebetween. Moreover, a desired water-repellent material is provided on the surface (ejection face facing to the recording medium) of the ejection opening plate 425.

In the present example, two lines of the heaters 421 or the ejection openings 422 are disposed, and the heaters 421 or the ejection openings 422 within each line are disposed so as to shift with each other by a half of array pitch in an array direction, i.e. sub-scanning direction. In this respect, by arraying 128 pieces of heaters 421 or ejection openings 422 per one line in a density of 600 dpi, a resolution of 1200 dpi is realized per one color of ink. Then, the configuration of the recording element substrate corresponding to the above six colors is disposed on the first plate 430.

A method of making a recording element substrate and an ejection face will be described by using FIGS. 8A to 8G.

Figure 8A:
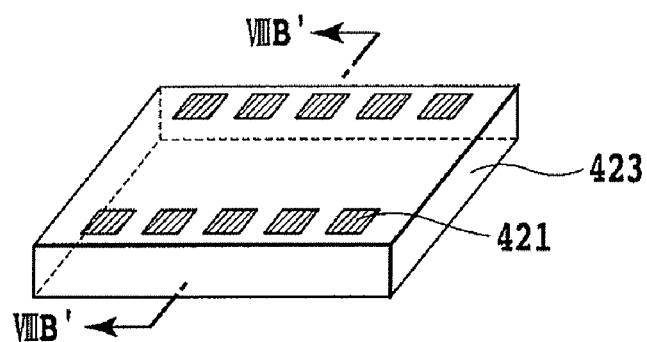
FIG. 8A is an explanatory drawing of a production step of the recording element substrate of FIG. 7.
Figure 8B:
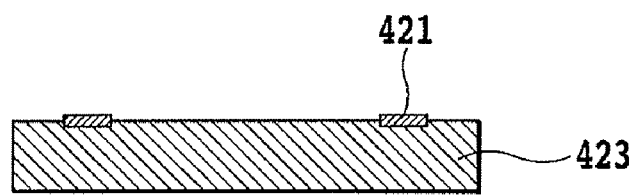
FIG. 8B is an explanatory drawing of the production step of the recording element substrate of FIG. 7.

FIGS. 8A and 8B are a diagrammatic perspective view of the recording element substrate 420 and a diagrammatic cross-sectional view thereof taken along the line VIIIB'-VIIIB', respectively. A plurality of heaters 421 is disposed on the base body 423 made of silicon and the like (an electrode and the like for applying a current to a heater are not illustrated).

Figure 8C:
FIG. 8C is an explanatory drawing of the production step of the recording element substrate of FIG. 7.

FIG. 8C is a drawing in which an ink flow path pattern formation material 433 is disposed on the base body 423 shown in FIG. 8B using a positive type resist. The ink flow path pattern formation material 433 corresponds to a pattern for configuring a common liquid chamber for temporarily holding the ink which is supplied to each ejection opening, and ink flow paths which are branched in plural from the common liquid chamber to cause film boiling by the heater.

Figure 8D:
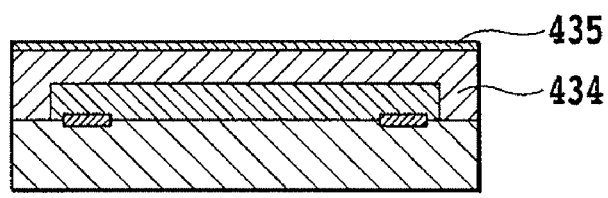
FIG. 8D is an explanatory drawing of the production process of the recording element substrate of FIG. 7.

FIG. 8D is a drawing showing the state where a nozzle formation material 434 made of a negative type resist and a water-repellent material 435 which is a negative type resist containing fluorine and siloxane molecules are formed on the ink flow path pattern formation material 433 shown in FIG. 8C. In the present embodiment, the ejection opening plate 425 is formed of these materials. The water-repellent property can be provided to the ejection face by using the water-repellent material 435 in the above manner. Alternatively, the ejection face can be changed to have desired surface properties in this step by changing a material which is to be combined with the nozzle formation material. Moreover, in a case where the water-repellent property is not necessary for the ejection face, the ejection face which does not have water-repellent property can be formed by not using a water-repellent material but using a nozzle material only.

Figure 8E:
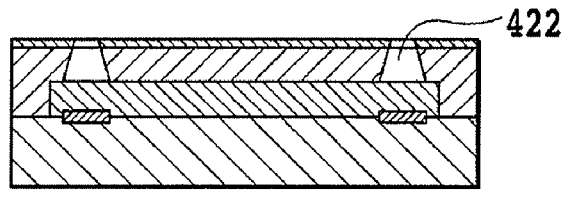
FIG. 8E is an explanatory drawing of the production step of the recording element substrate of FIG. 7.
Figure 8F:
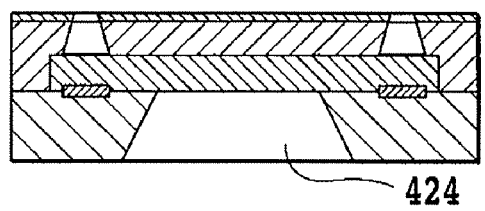
FIG. 8F is an explanatory drawing of the production step of the recording element substrate of FIG. 7.
Figure 8G:
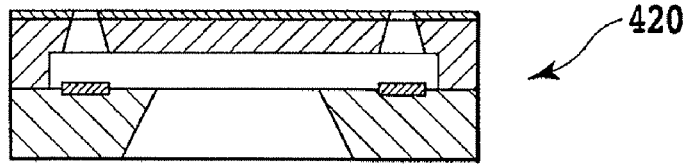
FIG. 8G is an explanatory drawing of the production step of the recording element substrate of FIG. 7.

FIG. 8E is a drawing showing the state where the ink ejection opening 422 and an ink path communicated therewith are formed by using a photolithography method, from the state of the FIG. 8D. Furthermore, FIG. 8F is a drawing showing the state where an ink supply port 424 is formed by anisotropically etching silicon from the back surface side of the base body 423 while the ejection opening formation surface side and the like are appropriately protected, from the state of the FIG. 8E. FIG. 8G shows the state where a recording element substrate is completed by eluting the ink flow path formation pattern material 433 from the state of FIG. 8F. The recording element substrate 420 thus completed is disposed on the first plate 430. Furthermore, the connection with and the electrical mounting on each section, for example, are performed, and thereby the configuration shown in FIG. 5 is obtained.

Referring once more to FIG. 4, the recording medium 6 is intermittently transported in the direction perpendicular to the scanning direction of the carriage 100. The recording medium 6 is supported by a pair of roller units (not illustrated) provided on the upstream side and the downstream side of the transport direction, respectively, imparted with a certain amount of tension, and then transported while maintaining flatness relative to the ink ejection opening. Recording across a width corresponding to the array width of the ejection openings of the head unit 1 in association with the movement of the carriage 100 and the transportation of the recording medium 6 are then alternately repeated, and thereby recording is performed on the entire recording medium 6. The illustrated apparatus is provided with a linear encoder 4 for the purpose of detecting the movement position of the carriage in the main scanning direction.

Figure 9:
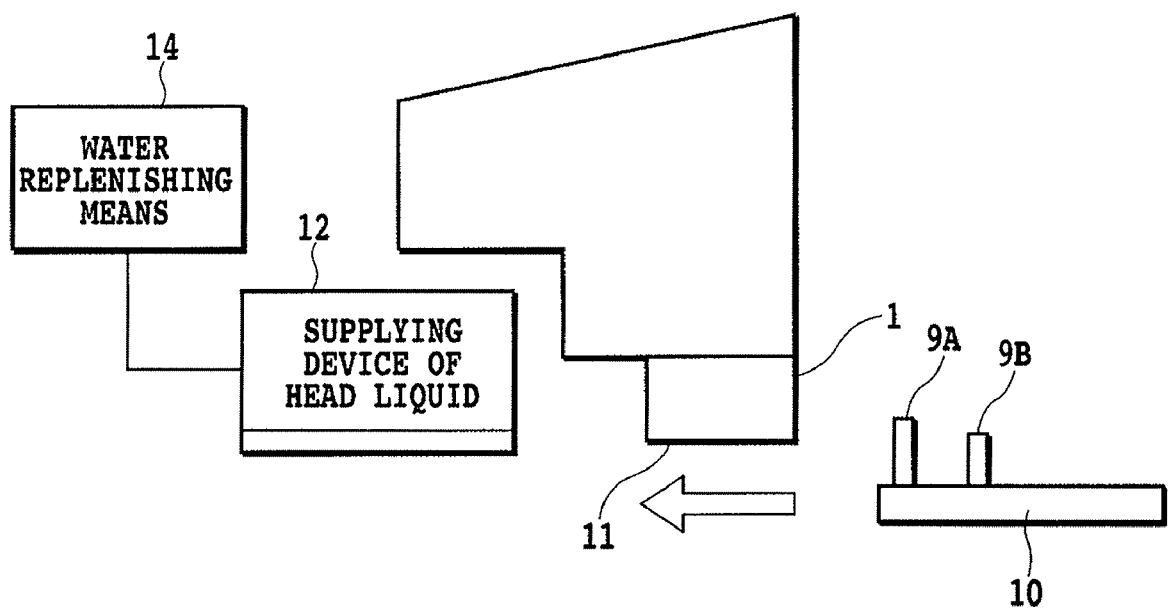
FIG. 9 is a diagrammatical side view showing one example of a cleaning device used in the printer of FIG. 4.

The carriage 100 stops at the home position as necessary at the time of starting recording or during recording. A cap and a maintenance mechanism 7 including a cleaning device described below in FIG. 9 are provided near the home position. The cap is supported in a manner capable of being ascended and descended. In an ascended position, the cap can cap the ejection face of the head unit 1, and thereby it is possible to protect the face at the non-recording operation time or to perform a suction recovery. At a recording operation time, the cap is set in a descended position to avoid the interference with the head unit 1, or it is possible to receive preliminary ejection by facing to the ejection face.

FIG. 9 is a diagrammatic side view showing an example of the cleaning device related to the present invention, and viewed from the direction indicated by the arrow of FIG. 4.

Wiper blades 9A and 9B made of an elastic member such as rubber and the like are fixed to a wiper holder 10. The wiper holder 10 is movable in the right and left directions (the direction which is perpendicular to the main scanning direction of the recording head 1, and in which the ink ejection openings are arrayed) shown in the drawing. The wiper blade 9A and 9B are different in height from each other. As a result, when slidingly contacting the ejection face 11 of the recording head 1, the former bends to a relatively large extent, thus causing the side section thereof to touch the ejection face 11, and the latter bends to a relatively small extent, thus cause the top end section to touch the ejection face 11.

A numeral 12 indicates a supplying device for transferring the head liquid by bringing the wiper blades into contact therewith, and can be in a form in which the head liquid is accommodated in a tank (container). Moreover, the supplying device can have an absorption body in at least the contact portion therewith, the absorption body holding a predetermined amount of the head liquid, while causing the head liquid to bleed out in accordance with the contact with the wiper blades. Furthermore, a stirring device or the like may be added thereto in order to obtain the uniformly mixed state of the head liquid. A numeral 14 indicates a water replenishing device, which is disposed to maintain the head liquid within the above range of a component ratio even when moisture is evaporated due to an extreme change in an environment. This replenishing device is not necessary to operate as long as the mixed state is maintained which has been determined by a method of determining the ratio according to the present invention of the solvent according to the present invention. However, the mixing ratio can suitably be changed or maintained within the range which the present invention discloses in accordance with the desired conditions. Naturally, the head liquid may lose water content because an unexpected event occurs under normal circumstances such as the case where the head liquid is placed in an abnormal environment, or left in an inappropriate condition. In such a case, the head liquid is preferably used by replenishing with this means 14 to keep in the conditions within the range of the present invention. The present invention relates to a method of stabilizing a component ratio of the head liquid in which the head liquid can be supplied on the surface of an inkjet head provided with ejection openings to eject an ink basically containing a color material therethrough, and in which the head liquid contains a previously mixed nonvolatile solvent and water as components. As a preferable form of the present invention, the following can be included. Specifically, the present invention is characterized by including a step of replenishing water in the head liquid to maintain the ratio of the water mixed with the nonvolatile solvent within the range of a ratio which causes a smaller change in mass than that in a case where the nonvolatile solvent by itself is caused to absorb moisture. The inkjet recording apparatus related to the preferred aspect of the present invention includes the following requirements. Specifically, the inkjet recording apparatus is provided with:

means for supplying a head liquid containing, as components, a nonvolatile solvent and water which have previously been mixed with each other, by any type of a control and a drive, in order to clean the surface of an inkjet head provided with ejection openings to eject an ink containing a color material therethrough; and means for replenishing water in the head liquid.

In a cleaning operation, the head liquid first is transferred by bringing the wiper blades into contact with the supplying device 12 in a state where the recording head 1 is caused to stand by in a position apart from the home position, or before the recording head 1 is moved to the home position. Then, the wiper holder 10 is returned to the position shown in the drawing, and the recording head is set in the home position, and thereafter the wiper holder 10 is once more moved in the direction indicated by the arrow. In this moving process, to begin with, the relatively long wiper blade 9A first slidingly contacts the ejection face 11, and the relatively short wiper blade 9B follows this.

Figure 10:
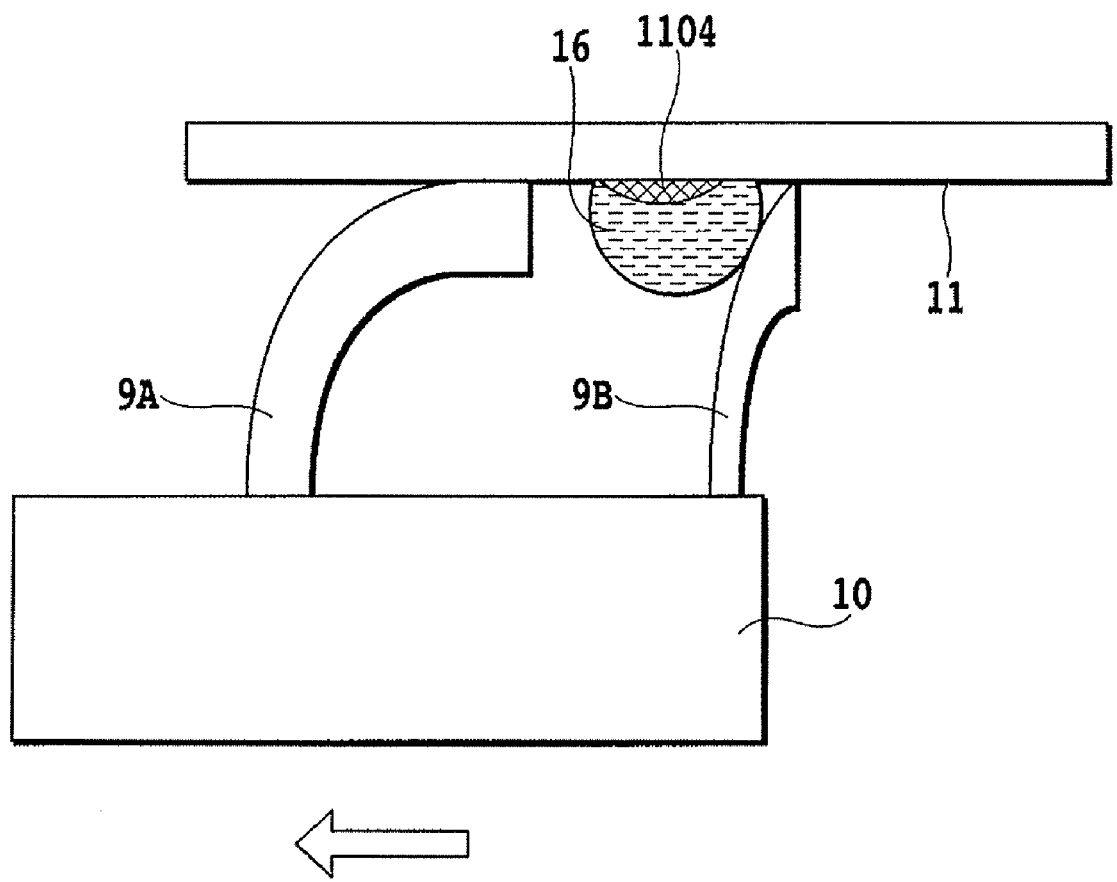
FIG. 10 is a diagrammatical drawing for explaining the operation of the cleaning device of FIG. 5.

FIG. 10 is an explanatory drawing of this process. The wiper blade 9A bends to a relatively large extent, and thus the side section thereof slidingly contacts the ejection face 11 to efficiently transfer the head liquid 16 to the ejection face 11. Even if there is an ink residue 1104 on the ejection face 11, the ink residue 1104 is dissolved by providing the head liquid 16. In this state, the top end section (edge) of the wiper blade 9B touches the ejection face 11 to efficiently scrape off the dissolved matter of the ink residue. Thus, the cleaning of the recording head is performed.

Note that, as a result of the wiping, the dissolved matter of the ink residue is attached on the wiper blade. When this flows down along the wiper blade by the action of gravity, a member which receives this at the position below the illustrated wiper holder 10 can be provided. However, it is desirable to provide means (a sponge, scraper, or the like) which touches the wiper blades 9A and 9B near the supplying device 12 to actively receive the dissolved matter from the wiper blades, or the above process, and thereby to clean the wiper blades. If the head liquid is transferred after the wiper blades are made into a cleaned state, it is possible to prepare for the next wiping operation immediately.

The composition of the head liquid according to the present invention is preferably employed in performing such a cleaning as well. The material, shape, dimension, and position relative to the slidingly contacted target of the wiper blades should be determined so that a desired transferred amount (amount transferred from the supplying device to the wiper blades and amount transferred from the wiper blade to the ejection face) can be obtained in association with their sliding abutment with the supplying device 12 and the ejection face 11. This is because the desired transferred amount cannot be obtained when changes in weight and in physical properties of the head liquid caused by changes in environment are large, and thereby the reduction in a cleaning performance is likely to occur.

The effect of the present invention will be verified below by citing more specific example and comparative example.

Example

Distribution Test of Accommodation Container for Head Liquid

Head liquids having compositions shown in Table 1 were used in the example.

TABLE 1

| Head liquid | Glycerin | Water |
|---|---|---|
| Head liquid 1 | 95% | 5% |
| Head liquid 2 | 80% | 20% |
| Head liquid 3 | 75% | 25% |

These head liquids were filled in ink tanks "BCI-3e color" available from Canon Inc.). The ink tank was put in an oven set at a temperature (60° C.) which is an assumed environment during distribution. Then, a state in which the head liquids were evaporated was observed. Note that, the ink tank includes a first liquid chamber portion which directly stores an ink, and a second liquid chamber portion in which an absorption body for impregnating and holding the ink to generate a preferable negative pressure in a nozzle of a recording head. Moreover, at this time, a protection cap for protecting an ejection face of the ink tank was removed considering the distribution of the ink tank which remains mounted on the main body of a printer.

First, Table 2 shows the results of the observation of the liquids in the ink tanks after two weeks for which the samples were left stand.

TABLE 2

| Head liquid | State of the head liquid in the tank |
|---|---|
| Head liquid 1 | A small amount of air was present in the first liquid chamber |
| Head liquid 2 | A small amount of air was present in the first liquid chamber |
| Head liquid 3 | A small amount of air was present in the first liquid chamber |

Figure 11:
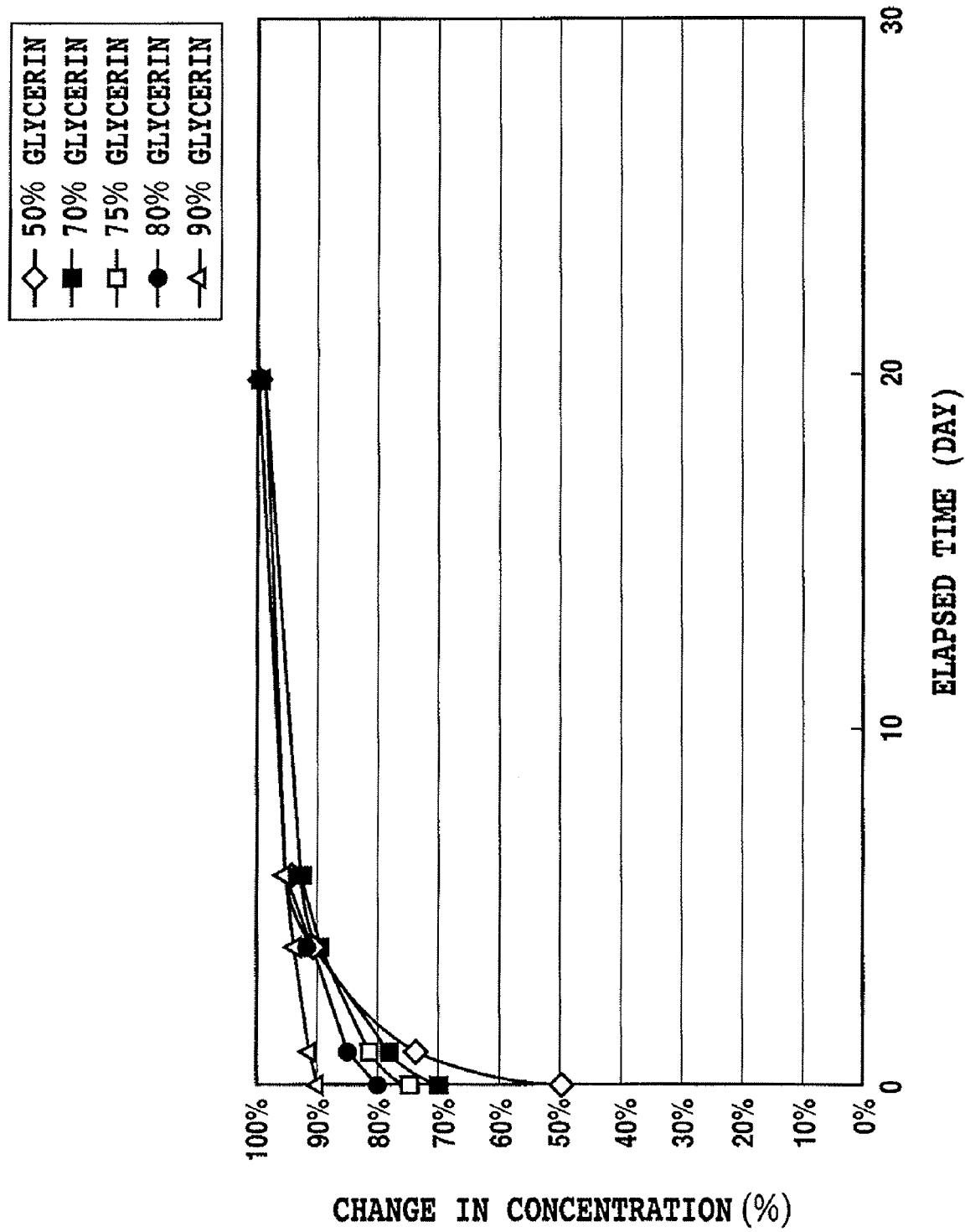
FIG. 11 is a graph showing changes in concentration of glycerin when distribution test is performed on various head liquids used in each example.

The changes in concentration of glycerin were as shown in FIG. 11.

The change in weight was not observed in any of "the head liquid 1" to "the head liquid 3" related to the present example because the liquid contained an appropriate amount of water. From the results of the above distribution test, it was observed that the changes in concentration in association with the moisture evaporation were inhibited to a small extent.

Wiping Duration Test

Using the "the head liquid 1" to "the head liquid 3" which had gone through the above distribution test, a wiping duration test was carried out subsequently. Here, assuming the environment for the actual use, the operation of cleaning the ejection face was continuously repeated 5000 times using the printer to observe the changes in recording state before and after the test.

The conditions of the duration test are as follows.

Main body for evaluation: The main body used for evaluation was one made by modifying the recovery system of the inkjet printer "PIXUS850i" available from Canon Inc. as shown in FIG. 4.

Head liquid for evaluation and accommodation container: The form used in the above distribution test was basically used. It should be noted, however, that modification was performed so that the sliding contact of wiper blades and the transfer of the head liquid became favorable.

Environment for evaluation: The tests were carried out at room temperatures of 30° C. and 15° C. as actually used environment after the samples had been left stand at 60° C. for two weeks in the same manner as above.

Ink for evaluation: The ink having the composition shown in Table 3 was attached in the color tank position of the recording head to perform the evaluation.

TABLE 3

| Composition | | Ink i (self-dispersion + polymer) | Ink ii (dye + polymer) | Ink iii (resin dispersion pigment) |
|---|---|---|---|---|
| Solvent | Glycerin | 5% | 5% | 5% |
| | Diethylene glycol | 5% | 5% | 5% |
| Surfactant | Acetylenol EH . . . (Note 1) | 0.2% | 0.2% | 0.2% |
| Color material | CABOJET 300 (solid content) (self dispersion pigment) . . . (Note 2) | 4% | — | — |
| | CI. DBL: 199 (soluble dye) | — | 3% | — |
| | Pigment dispersion liquid 1 . . . (Note 3) | — | — | 50% |
| Polymer | Styrene/acrylic acid copolymer (Molecular weight: 10000 Acid value: 100) | 2% | 1% | — |
| Water | | Remainder | Remainder | Remainder |

(Note 1)
Trade name Acetylenol available from Kawaken Fine Chemicals Co., Ltd.
(Note 2)
A self-dispersion pigment available from Cabot Corporation
(Note 3)
A pigment dispersion liquid 1 prepared by the following method was used.

10 parts of carbon black having a specific surface area of 210 m$^2$/g and a DBP oil absorption amount of 74 ml/100 g, 20 parts of 10% sodium hydroxide-neutralized aqueous solution of styrene-acrylic acid copolymer having an acid value of 200 and a weight-average molecular weight of 10000, and further 70 parts of ion-exchanged water were mixed. The mixture was then dispersed for 1 hour using a sand grinder. Thereafter, rough and large particles were removed by means of a centrifugal separation process. Subsequently, the mixture was subjected to pressure filtration using a micro filter having a pore size of 3.0 μm (available from FUJIFILM Corporation) to obtain a pigment dispersion liquid 1 containing a resin dispersion type pigment. The obtained pigment dispersion liquid 1 had the values of physical properties of a solid content of 10%, a pH of 10.0 and an average particle diameter of 120 nm.

Evaluation Results

Evaluation was performed by observing the changes in recording states before and after the duration test in temperature conditions of 30° C. and 15° C. At this time, a nozzle check pattern built in the main body of the printer was printed on a high quality-exclusive paper to observe the misalignment (deviation) of the dot formation position. The evaluation was performed using the following three ratings.

○: A favorable printing is obtained without deviation in the nozzle check pattern (there is no difference from the printing quality obtained when a genuine ink is used in the main body of an unmodified printer.)

Δ: Deviations are generated in a part of the nozzle check pattern.

x: Deviations are generated in the entire area of the nozzle check pattern.

Evaluation results at each temperature are shown in Tables 4 and 5.

TABLE 4

Duration evaluation (30° C. environment)

| Head liquid | Ink i | Ink ii | Ink iii |
|---|---|---|---|
| Head liquid 1 | ○ | ○ | ○ |
| Head liquid 2 | ○ | ○ | ○ |
| Head liquid 3 | ○ | ○ | ○ |

TABLE 5

Duration evaluation (15° C. environment)

| Head liquid | Ink i | Ink ii | Ink iii |
|---|---|---|---|
| Head liquid 1 | ○ | ○ | ○ |
| Head liquid 2 | ○ | ○ | ○ |
| Head liquid 3 | ○ | ○ | ○ |

Comparative Example

The same test as the duration test in the example was carried out using head liquids having compositions shown in Table 6.

TABLE 6

| Head liquid | Glycerin | Water |
|---|---|---|
| Head liquid 4 | 100% | 0% |
| Head liquid 5 | 50% | 50% |

The evaluation results were as follows.

TABLE 7

Duration evaluation (30° C. environment)

| Head liquid | Ink i | Ink ii | Ink iii |
|---|---|---|---|
| Head liquid 4 | ○ | ○ | ○ |
| Head liquid 5 | ○ | ○ | ○ |

TABLE 8

Duration evaluation (15° C. environment)

| Head liquid | Ink i | Ink ii | Ink iii |
|---|---|---|---|
| Head liquid 4 | x | x | x |
| Head liquid 5 | x | x | x |

As shown in these, "the head liquid 4" and "the head liquid 5" showed favorable evaluation results in an environment at 30° C., but generated deviations in the entire area of the nozzle check pattern in an environment at 15° C.

The effects of the present invention were verified as shown above. This is also the same for a case where the sample has been put in an oven set at 45° C., and left stand for two weeks or more prior to the distribution test, and a case where the duration test was further carried out. In addition, favorable results were obtained in a case where the above "the head liquid 1" to "the head liquid 3" were filled in ink tanks having a form different from the above one, for example, BCI-7 available from Canon Inc. to carry out a distribution test and a duration test.

Note that, in the above example, exemplified was an embodiment in which the head liquid was transferred to the wiper blades, thereafter causing these to perform wiping on the ejection face in order to perform cleaning. However, the present invention is not limited to such an aspect. For example, a configuration in which the head liquid is applied (supplied) to the ejection face using a member other than a wiper to thereafter perform wiping may be used. This is because the head liquid of the composition according to the present invention is preferably used to favorably transfer (supply) an ink even in such a form.

As described above, it is understood that the water mixing ratio relative to a solvent in the head liquid of the present invention is an important factor. When the kind of the solvents of the head liquid is changed or pluralized, practical applications are made possible by judging their characteristics in the above manner to determine the ratio thereof. Such a determination of the ratio is conventionally unexpected. In this respect, as a preferred aspect of the present invention, there exists an invention which is a method of determining the contents of the components of the head liquid, characterized by determining the amount of water to be mixed with the nonvolatile solvent as an amount to provide a smaller change in mass than that in a case where the nonvolatile solvent by itself is caused to absorb moisture. Here, the head liquid is one which can be supplied on the surface of an inkjet head provided with an ejection opening to eject an ink containing a color material therethrough, and which contains a previously mixed nonvolatile solvent and water as components. Note that, the head liquid of the present invention may be prepared by adding an additive and the like which have no influence on the mixing ratio of a solvent and water.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application is a continuation application of PCT application No. PCT/JP2005/023849 under 37 Code of Federal Regulations §1.53(b) and the said PCT application claims the benefit of Japanese Patent Application Nos. 2004-381749, filed Dec. 28, 2004 and 2005-235404, filed Aug. 15, 2005, which are hereby incorporated by reference herein in their entirety.

What is claimed is:

1. A head cleaning liquid applied on a surface of an inkjet head provided with ejection openings to eject an ink containing a pigment as a color material therethrough by an application member moving relative to the surface, wherein the head cleaning liquid to be applied on the surface of the head is supplied on the application member for applying, and is composed of glycerin and water within a range of a mass ratio from 75:25 to 95:5, respectively.

2. A head cleaning liquid as claimed in claim 1, wherein the head cleaning liquid is contained in a container, and wherein by moving the application member relative to the container, the head cleaning liquid is supplied to the application member.

3. A method of determining contents of components of a head cleaning liquid which can be supplied on a surface of an inkjet head provided with ejection openings to eject an ink containing a color material therethrough, and which contains a previously mixed nonvolatile solvent and water as components, wherein an amount of water mixed with the nonvolatile solvent is determined as an amount which provides a smaller change in mass than that in a case where the nonvolatile solvent by itself is caused to absorb moisture.

4. A method of stabilizing a component ratio of a head cleaning liquid which can be supplied to a surface of an inkjet head provided with ejection openings to eject an ink containing a color material therethrough, and which contains a previously mixed nonvolatile solvent and water as components, the method comprising:

a step of replenishing water in the head cleaning liquid to maintain a ratio of water mixed with the nonvolatile solvent within a range of a ratio which provides a smaller change in mass than that in a case where the nonvolatile solvent by itself is caused to absorb moisture.

5. An inkjet recording apparatus comprising:

means for applying a head cleaning liquid containing a previously mixed nonvolatile solvent and water as components to clean a surface of a inkjet head provided with ejection openings to eject an ink containing a pigment as a color material therethrough;

a head cleaning liquid container for supplying the head cleaning liquid to the applying means; and means for replenishing water in the head cleaning liquid contained in the head cleaning liquid container, wherein the head cleaning liquid contains glycerin as the nonvolatile solvent, and wherein the replenishing means replenishes water so that the glycerin and water are within a range of a mass ratio from 75:25 to 95:5, respectively.

* * * * *